US012057602B2

(12) United States Patent
Peng et al.

(10) Patent No.: US 12,057,602 B2
(45) Date of Patent: Aug. 6, 2024

(54) ELECTROCHEMICAL DEVICE

(71) Applicant: NINGDE AMPEREX TECHNOLOGY LIMITED, Ningde (CN)

(72) Inventors: Xiexue Peng, Ningde (CN); Jianming Zheng, Ningde (CN); Chao Tang, Ningde (CN); Haiyang Nan, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 1145 days.

(21) Appl. No.: 16/651,736

(22) PCT Filed: Mar. 4, 2020

(86) PCT No.: PCT/CN2020/077802
§ 371 (c)(1),
(2) Date: Mar. 27, 2020

(87) PCT Pub. No.: WO2020/224316
PCT Pub. Date: Nov. 12, 2020

(65) Prior Publication Data
US 2023/0198096 A1    Jun. 22, 2023

(30) Foreign Application Priority Data

May 7, 2019    (CN) .................. 201910374230.7

(51) Int. Cl.
| | |
|---|---|
| *H01M 50/48* | (2021.01) |
| *H01M 10/05* | (2010.01) |
| *H01M 10/0525* | (2010.01) |
| *H01M 10/0567* | (2010.01) |
| *H01M 50/417* | (2021.01) |
| *H01M 50/42* | (2021.01) |
| *H01M 50/426* | (2021.01) |
| *H01M 50/434* | (2021.01) |
| *H01M 50/44* | (2021.01) |
| *H01M 50/446* | (2021.01) |
| *H01M 50/449* | (2021.01) |
| *H01M 50/451* | (2021.01) |
| *H01M 50/457* | (2021.01) |
| *H01M 50/489* | (2021.01) |
| *H01M 50/491* | (2021.01) |

(52) U.S. Cl.
CPC ..... *H01M 50/489* (2021.01); *H01M 10/0525* (2013.01); *H01M 10/0567* (2013.01); *H01M 50/417* (2021.01); *H01M 50/426* (2021.01); *H01M 50/434* (2021.01); *H01M 50/446* (2021.01); *H01M 50/449* (2021.01); *H01M 50/451* (2021.01); *H01M 50/457* (2021.01); *H01M 50/491* (2021.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 11,031,626 | B2 * | 6/2021 | Li | .......... H01M 4/505 |
| 2008/0220336 | A1 * | 9/2008 | Mun | ................ H01M 10/0567 |
| | | | | 429/338 |
| 2014/0178775 | A1 | 6/2014 | Lee et al. | |
| 2015/0162588 | A1 * | 6/2015 | Lee | ..................... H01M 50/494 |
| | | | | 156/50 |
| 2016/0301103 | A1 * | 10/2016 | Kim | ................. H01M 10/0567 |
| 2021/0234196 | A1 * | 7/2021 | Peng | ................. H01M 10/0568 |

FOREIGN PATENT DOCUMENTS

| | | | | |
|---|---|---|---|---|
| CN | 101511589 | A | 8/2009 | |
| CN | 101548425 | A | 9/2009 | |
| CN | 101640290 | A | 2/2010 | |
| CN | 103682416 | A | 3/2014 | |
| CN | 104205415 | A | 12/2014 | |
| CN | 106033824 | A | 10/2016 | |
| CN | 106058155 | * | 10/2016 | ........ H01M 10/0525 |
| CN | 106058155 | A | 10/2016 | |
| CN | 106848162 | A | 6/2017 | |
| CN | 108172746 | * | 6/2018 | .......... H01M 10/052 |
| CN | 108172746 | A | 6/2018 | |
| CN | 109687025 | * | 4/2019 | ........ H01M 10/0525 |
| CN | 109687025 | A | 4/2019 | |
| CN | 109786834 | A1 | 5/2019 | |
| CN | 110061176 | A | 7/2019 | |
| JP | 5369568 | B2 | 9/2013 | |

OTHER PUBLICATIONS

Chinese Second Office Action dated Aug. 21, 2020 in counterpart Chinese application 201910374230.7, 8 pages.
PCT International Search Report dated May 27, 2020 in counterpart PCT application PCT/CN2020/077802, 5 pages.
PCT Written Opinion dated May 27, 2020 in counterpart PCT application PCT/CN2020/077802, 5 pages.
Chinese First Office Action dated Mar. 16, 2020 in counterpart Chinese application 201910374230.7, 10 pges.
European Extended Search Report dated Jun. 26, 2023, in counterpart European application EP20712425.6, 7 pages in English.

* cited by examiner

*Primary Examiner* — Maria Laios
*Assistant Examiner* — Angela J Martin
(74) *Attorney, Agent, or Firm* — XSENSUS LLP

(57) ABSTRACT

The present application relates to an electrochemical device comprising a separator and an electrolyte, wherein the separator comprises a first porous layer and a second porous layer; and the electrolyte comprises at least one compound containing 2 to 3 cyano groups.

16 Claims, No Drawings

ELECTROCHEMICAL DEVICE

CROSS REFERENCE TO RELATED APPLICATIONS

The present application is a National Stage application of PCT international application: PCT/CN2020/077802 which claims the benefit of priority from the China Patent Application No. 201910374230.7, filed on 7 May 2019, the disclosure of which is hereby incorporated by reference in its entirety.

BACKGROUND

1. Technical Field

The present application relates to an electrochemical device, and more particularly to an electrochemical device comprising a separator and an electrolyte.

2. Description of the Related Art

Lithium ion batteries have gained a lot of attention due to characteristics such as high energy density, low maintenance cost, relatively low self-discharge, long cycle life, no memory effect, high working voltage and environmental friendliness. They are widely used in the fields of smart products (including electronic products such as mobile phones, notebook computers and cameras), electric tools and electric vehicles, and have gradually replaced conventional nickel-cadmium and nickel-metal hydride batteries. However, as the technology has developed rapidly and market requirements have diversified, there are more demands on the power supplies of electronic products, for example, thinner and lighter products, more diverse appearance, higher volume energy density and mass energy density, higher safety requirements, higher power and the like.

Under overcharge conditions, conventionally used batteries are prone to generate gas and heat, causing a potential safety hazard. Furthermore, under high temperature conditions, the battery electrolyte will have more side effects, resulting in thermal runaway of the battery, and causing safety problems such as an explosion or fire outbreak of the battery. At present, ever more attention is paid on how to improve battery capacity while balancing safety issues (such as overcharging and hot box).

SUMMARY

The present application provides an electrochemical device, including an electrolyte and a separator. The inventor has surprisingly discovered that the combination of a specific electrolyte and separator used in the present application can substantially improve overcharging performance, hot box performance and cycle performance of the battery.

The present application provides an electrochemical device, including: a separator, including a first porous layer and a second porous layer; and an electrolyte, including at least one compound containing 2 to 3 cyano groups.

In some embodiments, the pore closing temperature of the first porous layer is different from the pore closing temperature of the second porous layer.

In some embodiments, the material composition of the first porous layer and the material composition of the second porous layer is the same or different.

In some embodiments, the first porous layer is adjacent to the second porous layer, and the pore closing temperature of the second porous layer is higher than the pore closing temperature of the first porous layer.

In some embodiments, a coating including at least one of an inorganic particle and a polymer is provided on the first porous layer.

In some embodiments, the first porous layer or the second porous layer includes at least one of the following polymers: polyethylene, polypropylene, polyethylene glycol terephthalate, polybutylene terephthalate, poly(phenylene phthalamide), polyester, polyacetal, polyamide, polycarbonate, polyimide, polyether-ether-ketone, polyaryletherketone, polyetherimide, polyamide-imide, polybenzimidazole, polyether sulfone, polyphenyl ether, cyclo-olefin copolymer, polyphenylene sulfide and polyethylene naphthalene.

In some embodiments, the compound containing 2 to 3 cyano groups includes at least one of compounds of formula I-A or II-A:

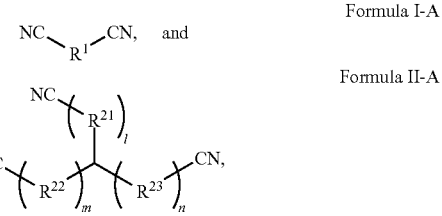

wherein, $R^1$, $R^{21}$, $R^{22}$, $R^{23}$ are each independently selected from substituted or unsubstituted $C_1$-$C_{10}$ alkylene, substituted or unsubstituted $C_1$-$C_{10}$ alkyleneoxy substituted or unsubstituted $C_2$-$C_{10}$ alkenyl, substituted or is unsubstituted $C_6$-$C_{10}$ aryl, and substituted or unsubstituted $C_3$-$C_{10}$ cycloalkyl; n, m and l are each independently selected from 0 or 1, and at least two of which are not 0.

In some embodiments, the compound containing 2 to 3 cyano groups includes at least one of the following compounds:

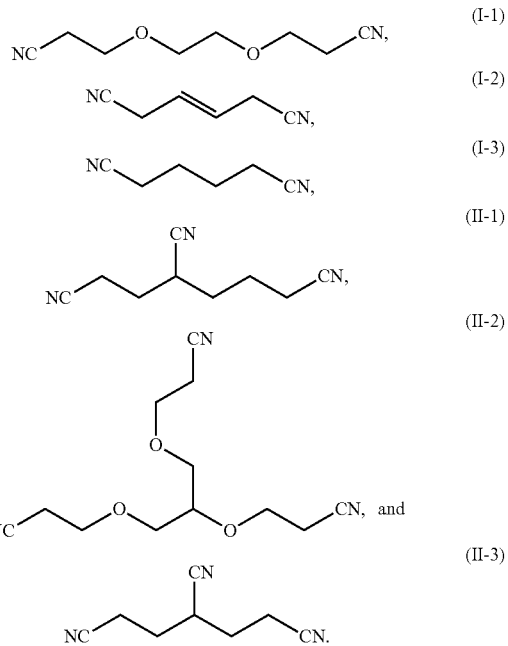

In some embodiments, the electrolyte in the electrochemical device further includes at least one of the compounds containing sulfur-oxygen double bonds of the following formulae:

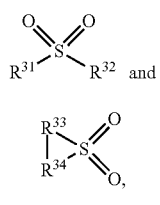

wherein $R^{31}$ and $R^{32}$ are each independently selected from substituted or unsubstituted $C_1$-$C_5$ alkyl, substituted or unsubstituted $C_2$-$C_{10}$ alkenyl, substituted or unsubstituted $C_6$-$C_{10}$ aryl, and substituted or unsubstituted $C_1$-$C_6$ heterocyclic groups containing 1 to 5 heteroatoms selected from O, S, and P; wherein, when substituted, it refers to being substituted by one or more substituent groups selected from halogen, nitryl, cyano, carboxyl or sulfonic acid group;

$R^{33}$ and $R^{34}$ are each independently selected from substituted or unsubstituted $C_1$-$C_6$ alkylene, and substituted or unsubstituted $C_2$-$C_6$ alkenylene, wherein carbon atoms in $R^{33}$ and $R^{34}$ can be optionally replaced with heteroatoms selected from O, S, and P, wherein, when substituted, it refers to being substituted by one or more substituent groups selected from halogen, $C_1$-$C_3$ alkyl or $C_2$-$C_4$ alkenyl.

In some embodiments, the compound containing sulfur-oxygen double bonds includes at least one of the following compounds:

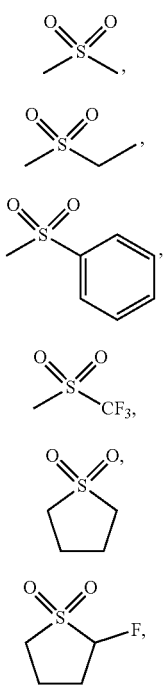

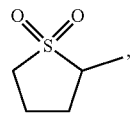

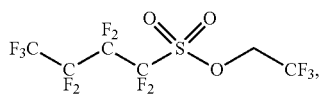

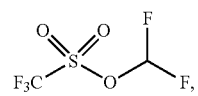

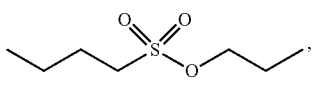

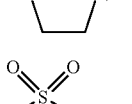

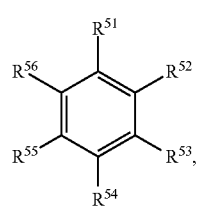

In some embodiments, the compound containing sulfur-oxygen double bonds includes sulphone compounds.

In some embodiments, the electrolyte in the electrochemical device further includes an aromatic compound, wherein the aromatic compound has the structure of the following formula V-A:

(V-A)

wherein $R^{51}$, $R^{52}$, $R^{53}$, $R^{54}$, $R^{55}$ and $R^{56}$ are each independently selected from substituted or unsubstituted $C_1$-$C_{10}$ alkyl, substituted or unsubstituted $C_3$-$C_{10}$ cycloalkyl, substituted or unsubstituted $C_3$-$C_{30}$ cycloalkenyl, is substituted or unsubstituted $C_2$-$C_{10}$ alkenyl, substituted or unsubstituted $C_6$-$C_{10}$ aryl, and substituted or unsubstituted $C_3$-$C_6$ heterocyclic groups, and the heteroatoms are selected from O, S, and P; wherein, any two adjacent groups in $R_{51}$, $R_{52}$, $R_{53}$, $R_{54}$, $R_{55}$ and $R_{56}$ may form $C_3$-$C_{10}$ cyclic hydrocarbon; wherein, when substituted, it refers to being substituted by one or more substituent groups selected from halogen, nitryl, cyano, carboxyl or sulfonic acid group.

In some embodiments, the aromatic compound includes at least one of the following compounds:

2-fluorotoluene, 3-fluorotoluene, 4-fluorotoluene, 2,4-difluorotoluene, 2-fluorobiphenyl, 3-fluorobiphenyl, 4-fluorobiphenyl, 4,4'-difluorobiphenyl, 2,4-difluorobiphenyl, o-cyclohexyl fluorobenzene, p-cyclohexyl fluorobenzene, 2,4-difluoroanisole, 2,5-difluoroanisole, 2,6-difluoroanisole, and 3,5-difluoroanisole.

In some embodiments, the electrolyte in the electrochemical device further includes at least one of the following compounds:

tri(2-tertiarypentylphenyl) phosphate, tri(3-tertiarypentylphenyl) phosphate, tri(4-tertiarypentylphenyl) phosphate, tri(2-cyclohexylphenyl) phosphate, tri(3-cyclohexylphenyl) phosphate, tri(4-cyclohexylphenyl) phosphate, triphenyl phosphate, tri(2-methylphenyl) phosphate, tri(2-tertiarybutylphenyl) phosphate, tris(2,2,2-trifluoroethyl) phosphate (TFEP), tri(2-tertiarypentylphenyl) phosphite, tri(3-tertiarypentylphenyl) phosphite, tri(4-tertiarypentylphenyl) phosphite, tri(2-cyclohexylphenyl) phosphite, tri(3-cyclohexylphenyl) phosphite, tri(4-cyclohexylphenyl) phosphite, triphenyl phosphite, tri(2-methylphenyl) phosphite, tri(2-tertiarybutylphenyl) phosphite, and tri(2,2,2-trifluoroethyl) phosphite.

In some embodiments, the thickness of the first porous layer in the separator is about 0.05 μm to about 10 μm, and the thickness of the coating provided on the first porous layer is about 0.06 μm to about 4 μm.

Additional aspects and advantages of the embodiments of the present application will be described or shown in the following description or illustrated by implementing the examples of the present application.

DETAILED DESCRIPTION

Embodiments of the present application are described in detail below. The embodiments of the present application should not be construed as a limitation for the present application.

Unless otherwise expressly indicated, the following terms used herein have the meanings indicated below.

The term "about" is used to describe and explain minor changes. When used in conjunction with an event or situation, this term may refer to examples where the event or situation occurs exactly and examples where the event or situation occurs very closely. For example, when used in conjunction with a numerical value, this term may refer to a variation range of less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other numerical values are sometimes presented herein in a range format. It should be understood that such range formats are for convenience and brevity, and should be interpreted flexibly, and include not only those numerical values that are specifically designated as range limitations, but also include all individual numerical values or sub-ranges that are within the range, as each numerical value and sub-range is specified explicitly.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

In the specific embodiments and claims, as for expression for carbon number, namely, numbers behind the capital letter "C", for example, in "$C_1$-$C_{20}$", and "$C_3$-$C_{20}$", numbers behind "C", for example, "1", "3", and "20" represent the carbon number in the functional group. That is, the functional group respectively may include 1 to 20 carbon atoms and 3 to 20 carbon atoms. For example, "$C_1$-$C_4$alkyl" refers to alkyl with 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$— or $(CH_3)_3C$—.

The terms "hydrocarbonyl", "alkyl", "alkylene", "aryl", and "heteroaryl" are groups known in the art. In some embodiments, "hydrocarbonyl", "alkyl", "alkylene", "aryl", and "heteroaryl" may adopt technical definitions recorded in the Chinese application CN109301326A, which is incorporated into the present application by reference in its entirety.

The term "alkoxyl" refers to L-O-group, wherein L is alkyl, alkenyl, alkynyl, cycloalkyl, and aryl. Alkoxyl herein may be alkoxyl with 1 to 20 carbon atoms, and also may be alkoxyl with 1 to 15 carbon atoms, alkoxyl with 1 to 10 carbon atoms, alkoxyl with 1 to 5 carbon atoms, alkoxyl with 5 to 20 carbon atoms, alkoxyl with 5 to 15 carbon atoms or alkoxyl with 5 to carbon atoms.

The term "cycloalkyl" encompasses cyclic alkyl. The cycloalkyl may be —$C_3$-$C_{20}$cycloalkyl, —$C_6$-$C_{20}$cycloalkyl, —$C_3$-$C_{10}$cycloalkyl, and —$C_3$-$C_6$cycloalkyl. For example, the cycloalkyl may be cyclopropyl, cyclobutyl, cyclopentyl, cyclohexyl and the like. Moreover, the cycloalkyl may be optionally substituted.

The term "alkenyl" refers to a monovalent unsaturated hydrocarbyl group which may be linear-chain or branched-chain and has at least one and usually one, two or three carbon-carbon double bonds. Unless otherwise defined, the alkenyl generally contains 2 to 20, 2 to 15, 2 to 10, 2 to 6 or 2 to 4 carbon atoms and includes (for example) —$C_{2-4}$alkenyl, —$C_{2-6}$alkenyl and —$C_{2-10}$alkenyl. Representative alkenyl includes (for example) ethenyl, n-propenyl, isopropenyl, n-but-2-enyl, but-3-enyl, n-hex-3-enyl and the like. Additionally, the alkenyl can be optionally substituted.

The term "alkynyl" refers to a monovalent unsaturated hydrocarbyl group which may be linear-chain or branched-chain and has at least one and usually has 1, 2 or 3 carbon-carbon triple bonds. Unless otherwise defined, the alkynyl generally contains 2 to 20, 2 to 15, 2 to 10, 3 to 10, 3 to 6 or 2 to 4 carbon atoms and includes, for example, —$C_2$-$C_4$alkynyl, —$C_3$-$C_6$alkynyl and —$C_3$-$C_{10}$alkynyl. Representative alkynyl includes, for example, ethynyl, prop-2-ynyl (n-propynyl), n-but-2-ynyl, n-hex-3-ynyl, and the like. Additionally, the alkynyl can be optionally substituted.

The term "alkenylene" refers to a difunctional group obtained by removing one hydrogen atom from the alkenyl defined above. Preferred alkenylene includes, but is not limited to, —CH=CH—, —C(CH$_3$)=CH—, —CH=CHCH$_2$— and the like. The term "aryl" refers to a monovalent aromatic hydrocarbon having a monocyclic (e.g., phenyl) or fused ring. Fused ring systems include completely unsaturated ring systems (e.g., naphthalene) and partially unsaturated ring systems (e.g., 1,2,3,4-tetrahydronaphthalene). Unless otherwise defined, the aryl typically contains 6 to 26, 6 to 20, 6 to 15, or 6 to 10 carbon ring atoms and includes, for example, —$C_{6-10}$aryl. Representative aryl includes, for example, phenyl, methylphenyl, propylphenyl, isopropylphenyl, benzyl, naphthalen-1-yl, naphthalen-2-yl and the like.

The term "heterocycle" or "heterocyclic group" refers to substituted or unsubstituted 5 to 8-membered monocyclic non-aromatic hydrocarbon or 5 to 8-membered bicyclic non-aromatic hydrocarbon, wherein 1 to 3 carbon atoms are replaced by heteroatom(s) selected from a nitrogen, oxygen, phosphorus or sulfur atom. Examples include pyrrolidin-2-yl; pyrrolidin-3-yl; piperidinyl; morpholin-4-yl and the like, and these groups can be substituted subsequently.

As used herein, the term "heteroatom" refers to O, S, P, N, B or isosteres thereof.

As used herein, the term "halogen" may be F, Cl, Br or I.

As used herein, the term "cyano" encompasses an organism containing organic group —CN.

The term "substituted or unsubstituted" means that a particular group is unsubstituted or substituted with one or more substituents. When the above substitutions are substituted, the group for substituting may be selected from a group consisting of halogen, alkyl, cycloalkyl, alkenyl, aryl and heteroaryl.

The present application provides an electrochemical device, including the electrolyte and the composite separator according to the present application. The specific embodiments of the electrolyte and the composite separator will be illustrated hereinafter.

I. Electrolyte

1. Compound Containing 2 to 3 Cyano Groups

The electrolyte in the electrochemical device of the present application comprises the compound containing 2 to 3 cyano groups described hereinafter.

The combined use of the compound containing 2 to 3 cyano groups and the separator of the present application can reduce decomposition of the electrolyte on the surface of an electrode during the overcharging process and the hot box process, and slow down temperature rise. Moreover, when the temperature rises to a certain value, lithium ion transfer will be restrained or completely prevented and further overcharging is prevented, thereby preventing thermal runaway, and improving overcharging and hot box properties.

In some embodiments, the electrolyte in the electrochemical device includes at least one compound containing 2 to 3 cyano groups selected from the following formulae:

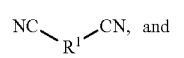

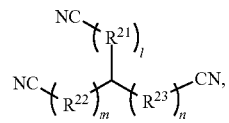

wherein, $R^1$, $R^{21}$, $R^{22}$, $R^{23}$ are each independently selected from substituted or unsubstituted $C_1$-$C_{10}$ alkylene, substituted or unsubstituted $C_1$-$C_{10}$ alkyleneoxy, substituted or unsubstituted $C_2$-$C_{10}$ alkenyl, substituted or unsubstituted $C_6$-$C_{10}$ aryl, and substituted or unsubstituted $C_3$-$C_{10}$ cycloalkyl; n, m, and l are respectively independently selected from 0 or 1, and at least two of which are not 0.

In some embodiments, carbon atoms in $R^1$, $R^{21}$, $R^{22}$, and $R^{23}$ may be optionally replaced with heteroatoms selected from O, S, and P, and when substituted, it refers to being substituted by fluorine atoms.

In some embodiments, in the compounds of the abovementioned formula I-A and II-A, $R^1$ is selected from substituted or unsubstituted $C_2$-$C_5$ alkylene, and substituted or unsubstituted $C_2$-$C_6$ alkenyl, and carbon atoms in $R^1$ are optionally replaced with O atoms; alternatively, $R^{21}$, $R^{22}$, and $R^{23}$ are each independently selected from substituted or unsubstituted $C_2$-$C_5$ alkylene, and substituted or unsubstituted $C_2$-$C_6$ alkenyl, and carbon atoms in $R^{21}$, $R^{22}$, and $R^{23}$ are optionally replaced with O atoms.

In some embodiments, the compound of the abovementioned formula I-A includes, but is not limited to, at least one of the following compounds:

methyl malononitrile, ethyl malononitrile, isopropyl malononitrile, tert-butyl malononitrile, methyl butanedinitrile, 2,2-dimethyl butanedinitrile, 2,3-dimethyl butanedinitrile, 2,3,3-trimethyl butanedinitrile, 2,2,3,3-tetramethyl butanedinitrile, 2,3-diethyl-2,3-dimethyl butanedinitrile, 2,2-diethyl-3,3-dimethyl butanedinitrile, 2,5-dimethyl-2,5-hexane dimethylnitrile, 2,3-diisobutyl-2,3-dimethyl butanedinitrile, 2,2-diisobutyl-3,3-dimethyl butanedinitrile, 2-methyl glutaronitrile, 2,3-dimethyl glutaronitrile, 2,4-dimethyl glutaronitrile, 2,2,3,3-tetramethyl glutaronitrile, 2,2,4,4-tetramethyl glutaronitrile, 2,2,3,4-tetramethyl glutaronitrile, 2,3,3,4-tetramethyl glutaronitrile, 1,4-dicyanoopentane, 2,6-dicyanooheptane, 2,7-dicyanooctane, 2,8-dicyanononane, 1,6-dicyanoodecane, 1,2-dicyanoobenzene, 1,3-dicyanoobenzene, 1,4-dicyanoobenzene, 3,3'-(ethylenedioxy) dipropionitrile, 3,3'-(ethylenedithiolo)dipropionitrile, and 3,9-bi(2-cyanoethyl)-2,4,8,10-tetraoxaspiro[5.5]undecane.

In some embodiments, the compound containing 2 to 3 cyano groups according to the present application includes, but is not limited to, at least one of the following compounds:

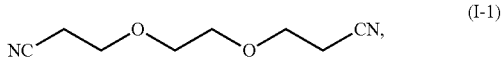

-continued

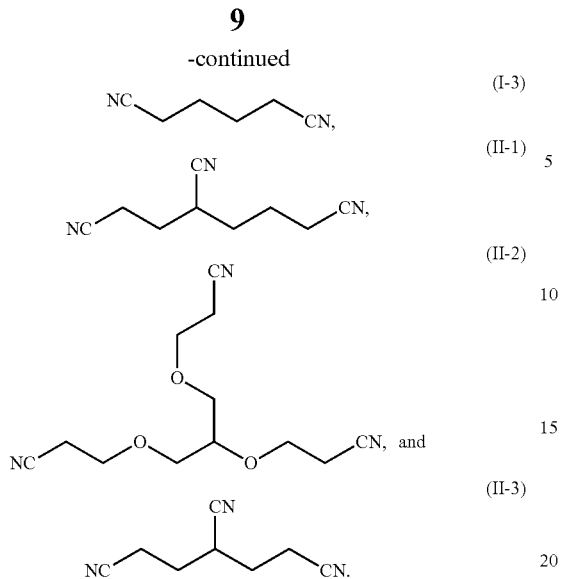

(I-3)

(II-1)

(II-2)

(II-3)

In some embodiments, the compound containing 2 to 3 cyano groups is the compound of the above formula II-1. In some embodiments, the compound containing 2 to 3 cyano groups comprises the combination of the compound of the formula II-1 and at least one compound of formula I-1 (DENE), formula I-2 (HDCN), and formula I-3 (AND).

In some embodiments, the compound containing 2 to 3 cyano groups is the compound of the above formula II-2. In some embodiments, the compound containing 2 to 3 cyano groups comprises the combination of the compound of the formula II-2 and at least one compound of formula I-1 (DENE), formula I-2 (HDCN), and formula I-3 (AND).

In some embodiments, based on the total weight of the electrolyte, the content of the compound containing 2 to 3 cyano groups is about 0.05 weight % to about 20 weight %.

In some embodiments, based on the total weight of the electrolyte, the content of the compound containing 2 to 3 cyano groups (for example, the compound of formula II-2) is about 0.05 weight %, about 0.1 weight %, about 0.2 weight %, about 0.3 weight %, about 0.4 weight %, about 0.5 weight %, about 1.0 weight %, about 1.5 weight %, about 2.0 weight %, about 3.0 weight %, about 4.0 weight %, about 5.0 weight %, about 6.0 weight %, about 7.0 weight %, about 8.0 weight %, about 9.0 weight %, about 10.0 weight %, about 12.0 weight %, about 15.0 weight %, about 17.0 weight %, about 19.0 weight %, about 20.0 weight %, or a range formed by any two of the abovementioned numerical values.

2. Compounds Containing Sulfur-Oxygen Double Bonds

In some embodiments, the electrolyte according to the present application may further include a compound containing sulfur-oxygen double bonds. The compound containing 2 to 3 cyano groups, the separator and the compound containing sulfur-oxygen double bonds according to the present application have a synergy function of improving the oxidation resistance of the electrolyte, which can reduce side reactions between the cathode and the electrolyte. Meanwhile, under overcharging conditions, film forming and passivation occur on the surface of the anode, and exothermic reactions between the metal on the anode surface and the electrolyte are reduced, thereby improving the overcharging performance of the battery.

In some embodiments, the compound containing sulfur-oxygen double bonds according to the present application includes at least one of compounds of the following formulae:

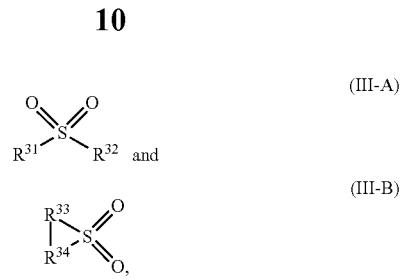

(III-A)

(III-B)

wherein $R^{31}$ and $R^{32}$ are each independently selected from substituted or unsubstituted $C_1$-$C_5$ alkyl, substituted or unsubstituted $C_2$-$C_{10}$ alkenyl, substituted or unsubstituted $C_6$-$C_{10}$ aryl, and substituted or unsubstituted $C_1$-$C_6$ heterocyclic groups containing 1 to 5 heteroatoms selected from O, S, and P, wherein, when substituted, it refers to being substituted by one or more substituent groups selected from halogen, nitryl, cyano, carboxyl or sulfonic acid group;

$R^{33}$ and $R^{34}$ are selected from substituted or unsubstituted $C_1$-$C_6$ alkylene, and substituted or unsubstituted $C_2$-$C_6$ alkenylene, wherein carbon atoms in $R^{33}$ and $R^{34}$ may be optionally replaced with heteroatoms selected from O, S, and P; wherein, when substituted, it refers to being substituted by one or more substituent groups selected from halogen, $C_1$-$C_3$ alkyl or $C_2$-$C_4$ alkenyl.

In some embodiments, the compound containing sulfur-oxygen double bonds in the electrolyte includes at least one of compounds of the following formulae:

(III-1)

(III-2)

(III-3)

(III-4)

(III-5)

(III-6)

(III-7)

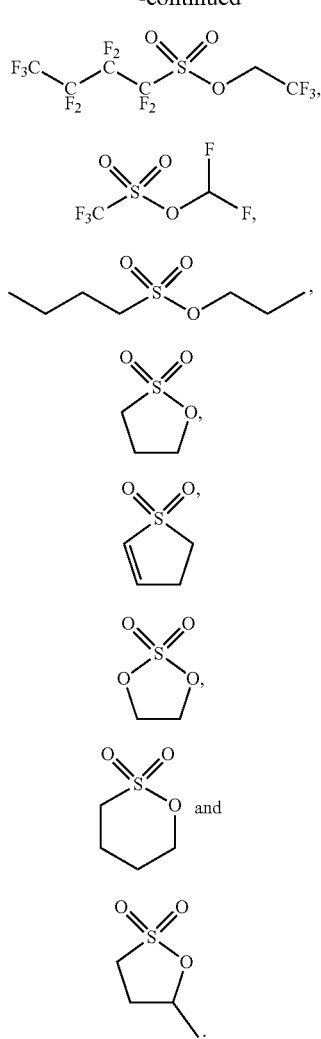

In some embodiments, the compound containing sulfur-oxygen double bonds used in the electrolyte comprises a sulphone compound.

In some embodiments, the compound containing sulfur-oxygen double bonds is selected from any one of sulfolane (formula III-5), 1,3-propane sultone (formula III-11), allyl-1,3-sultone (formula III-12), and ethylene sulfate (formula III-13).

In some embodiments, based on the total weight of the electrolyte, the content of the compound containing sulfur-oxygen double bonds is about 0.01 weight % to about 10 weight %. When the content of the compound containing sulfur-oxygen double bonds is about 0.01 weight % to about 10 weight %, side reactions caused by electron transfer between the electrolyte and the electrode can be further prevented; and the stability of the electrolyte can be enhanced.

In some embodiments, based on the total weight of the electrolyte, the content of the compound containing sulfur-oxygen double bonds in the present application is about 0.1 weight % to about 10 weight %, about 0.1 weight % to about 9.5 weight %, about 1.0 weight % to about 9.5 weight %, about 5.0 weight % to about 9.5 weight %.

In some embodiments, based on the total weight of the electrolyte, the content of the compound containing sulfur-oxygen double bonds (for example, the compound of formula III-5) is about 0.01 weight %, about 0.1 weight %, about 0.2 weight %, about 0.3 weight %, about 0.4 weight %, about 0.5 weight %, about 1.0 weight %, about 1.5 weight %, about 2.0 weight %, about 3.0 weight %, about 4.0 weight %, about 5.0 weight %, about 6.0 weight %, about 7.0 weight %, about 8.0 weight %, about 9.0 weight %, about 9.5 weight %, about 10.0 weight %, or a range formed by any two of the abovementioned numerical values.

3. Aromatic Compound

In some embodiments, the electrolyte of the present application may further include an aromatic compound. In the compound containing 2 to 3 cyano groups, the separator and the aromatic compound according to the present application can have a synergy function of reducing the conductivity decline caused by overcharging, and avoiding excessive gas production under a high temperature storage condition.

In some embodiments, the aromatic compound according to the present application has a structure of the following formula V-A:

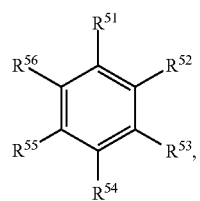

(V-A)

wherein $R^{51}$, $R^{52}$, $R^{53}$, $R^{54}$, $R^{55}$ and $R^{56}$ are each independently selected from substituted or unsubstituted $C_1$-$C_{10}$ alkyl, substituted or unsubstituted $C_3$-$C_{10}$ cycloalkyl, substituted or unsubstituted $C_3$-$C_{10}$ cycloalkenyl, substituted or unsubstituted $C_2$-$C_{10}$ alkenyl, substituted or unsubstituted $C_6$-$C_{10}$ aryl, and substituted or unsubstituted $C_3$-$C_6$ heterocyclic groups, and the heteroatoms are selected from O, S, and P, wherein any two adjacent groups of $R^{51}$, $R^{52}$, $R^{53}$, $R^{54}$, $R^{55}$ and $R^{56}$ may form $C_3$-$C_{10}$ cyclic hydrocarbon; wherein, when substituted, it refers to being substituted by one or more substituent groups selected from halogen, nitryl, cyano, carboxyl or sulfonic acid group.

In some embodiments, the aromatic compound used in the present application is fluorobenzene. In some embodiments, the aromatic compound of the present application is selected from at least one of the following compounds:

2-fluorotoluene, 3-fluorotoluene, 4-fluorotoluene, 2,4-difluorotoluene, 2-fluorobiphenyl, 3-fluorobiphenyl, 4-fluorobiphenyl, 4,4'-difluorobiphenyl, 2,4-difluorobiphenyl, o-cyclohexyl fluorobenzene, p-cyclohexyl fluorobenzene, 2,4-difluoroanisole, 2,5-difluoroanisole, 2,6-difluoroanisole, and 3,5-difluoroanisole.

In some embodiments, the aromatic compound is 4-fluorotoluene (PFT), 2,4-difluorobiphenyl (DFBP) or a combination thereof.

In some embodiments, based on the total weight of the electrolyte, the content of the aromatic compound is about 1.0 weight % to about 10 weight %. Specifically, based on the total weight of the electrolyte, the content of the aromatic compound is about 0.1 weight % to about 15 weight %, about 0.1 weight % to about 10 weight %, about 0.5 weight % to about 10 weight %, about 1.0 weight % to about 10 weight %.

In some embodiments, based on the total weight of the electrolyte, the content of the aromatic compound (for example, PFT or DFBP) is about 0.1 weight %, about 0.2 weight %, about 0.3 weight %, about 0.4 weight %, about 0.5 weight %, about 1.0 weight %, about 1.5 weight %, about 2.0 weight %, about 3.0 weight %, about 4.0 weight %, about 5.0 weight %, about 6.0 weight %, about 7.0 weight %, about 8.0 weight %, about 9.0 weight %, or about 10.0 weight %, or a range formed by any two of the abovementioned numerical values.

4. Phosphate/Phosphite

In some embodiments, the electrolyte in the present application may further comprise phosphate and/or phosphite additives. In the compound containing 2 to 3 cyano groups used in the present application, the separator of the present application and phosphate/phosphite achieve a combined effect to improve the safety. Meanwhile, a more steady interfacial membrane may be formed on the surface of the anode, so that the interfacial membrane is diversified in composition, the stability of the electrolyte is improved, electrolyte decomposition is restrained, and further high temperature storage performance may be improved.

In some embodiments, the phosphate/phosphite includes at least one of the following compounds:

tri(2-tertiarypentylphenyl) phosphate, tri(3-tertiarypentylphenyl) phosphate, tri(4-tertiarypentylphenyl) phosphate, tri(2-cyclohexylphenyl) phosphate, tri(3-cyclohexylphenyl) phosphate, tri(4-cyclohexylphenyl) phosphate, triphenyl phosphate, tri(2-methylphenyl) phosphate, tri(2-tertiarybutylphenyl) phosphate, tris(2,2,2-trifluoroethyl) phosphate (TFEP), tri(2-tertiarypentylphenyl) phosphite, tri(3-tertiarypentylphenyl) phosphite, tri(4-tertiarypentylphenyl) phosphite, tri(2-cyclohexylphenyl) phosphite, tri(3-cyclohexylphenyl) phosphite, tri(4-cyclohexylphenyl) phosphite, triphenyl phosphite, tri(2-methylphenyl) phosphite, tri(2-tertiarybutylphenyl) phosphite, and tri(2,2,2-trifluoroethyl) phosphite.

In some embodiments, the phosphate additive is triphenyl phosphate (TPP). In some embodiments, the phosphite additive is tri(2,2,2-trifluoroethyl) phosphite (TTFEP). In some embodiments, the additive is the combination of TPP and TTFEP.

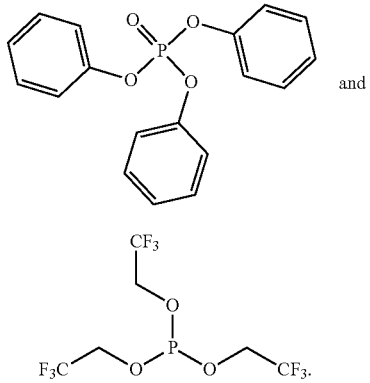

(TPP) and (TTFEP)

In some embodiments, based on the total weight of the electrolyte, the content of the phosphate and/or phosphite additive is about 0.01 weight % to about 10 weight %. Specifically, based on the total weight of the electrolyte, the content of the phosphate and/or phosphite additive is about 0.05 weight % to about 10 weight %, about 0.1 weight % to about 10 weight %, about 0.5 weight % to about 10 weight %, about 1.0 weight % to about 10 weight %, or about 1.0 weight % to about 5 weight %.

In some embodiments, based on the total weight of the electrolyte, the content of the phosphate and/or phosphite additive (for example, TPP and/or TTFEP) is about 0.01 weight %, about 0.1 weight %, about 0.2 weight %, about 0.3 weight %, about 0.4 weight %, about 0.5 weight %, about 1.0 weight %, about 1.5 weight %, about 2.0 weight %, about 3.0 weight %, about 4.0 weight %, about 5.0 weight %, about 6.0 weight %, about 7.0 weight %, about 8.0 weight %, about 9.0 weight %, about 10.0 weight % or a range formed by any two of the abovementioned numerical values.

5. Cyclic Carbonate Additive

The electrolyte of the present application may also contain a cyclic carbonate additive. Specifically, the cyclic carbonate additive is a compound having a structure shown as formula IV-A:

wherein, $R^4$ is selected from substituted or unsubstituted $C_1$-$C_6$ alkylene, and substituted or unsubstituted $C_2$-$C_6$ alkenylene; the substituent group is selected from halogen, $C_1$-$C_6$ alkyl, and $C_2$-$C_6$ alkenyl; and the substituent group is selected from halogen, $C_1$-$C_3$ alkyl, and $C_2$-$C_4$ alkenyl.

In some embodiments, $R^4$ is selected from substituted or unsubstituted $C_1$-$C_4$ alkylene, and substituted or unsubstituted $C_2$-$C_4$ alkenylene; and the substituent group is selected from halogen, $C_1$-$C_3$ alkyl, and $C_2$-$C_4$ alkenyl.

The cyclic carbonate compound is selected from at least one of fluoroethylene carbonate, vinylene carbonate and vinyl ethylene carbonate; which have the specific structure formulae as follows:

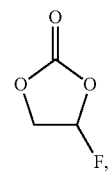

(Formula IV-1)

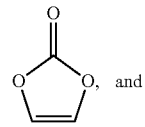

(Formula IV-2)

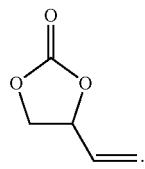

(Formula IV-3)

As a modification to the electrolyte of the present application, the cyclic carbonate compound may also be selected from:

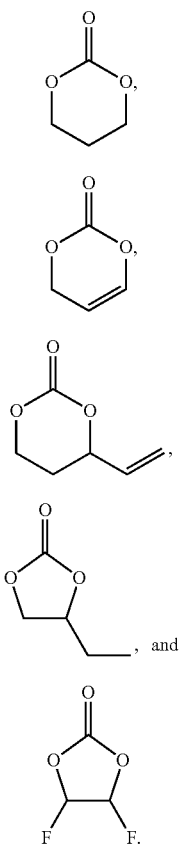

(Formula IV-4)

(Formula IV-5)

(Formula IV-6)

(Formula IV-7)

, and (Formula IV-8)

As a modification to a non-aqueous electrolyte of the present application, the mass percentage content of a cyclic carbonate additive of the present application in the non-aqueous electrolyte is about 0.01% to about 30%, and further preferably is about 0.1% to about 10%.

As a modification to a non-aqueous electrolyte of the present application, the mass percentage content of a cyclic carbonate additive of the present application in the non-aqueous electrolyte is about 0.1% to about 10%.

In some embodiments, based on the total weight of the electrolyte, the content of the cyclic carbonate additive is about 0.01 weight % to about 30 weight %. Specifically, based on the total weight of the electrolyte, the content of the cyclic carbonate additive is about 0.1 weight % to about 15 weight %, about 0.1 weight % to about 10 weight %, about 0.5 weight % to about 10 weight %, and about 1.0 weight % to about 10 weight %.

In some embodiments, based on the total weight of the electrolyte, the content of the cyclic carbonate additive is about 0.01 weight %, about 0.1 weight %, about 0.2 weight %, about 0.3 weight %, about 0.4 weight %, about 0.5 weight %, about 1.0 weight %, about 1.5 weight %, about 2.0 weight %, about 3.0 weight %, about 4.0 weight %, about 5.0 weight %, about 6.0 weight %, about 7.0 weight %, about 8.0 weight %, about 9.0 weight %, about 10.0 weight %, about 15.0 weight %, about 17.0 weight %, about 19.0 weight %, about 20.0 weight %, about 25.0 weight %, about 30.0 weight % or a range formed by any two of the abovementioned numerical values.

6. Anhydride

In some embodiments, the electrolyte may also contain anhydride, the combined use of the anhydride, wherein the compound containing 2 to 3 cyano groups used in the present application and the separator of the present application may further improve the chemical stability of the electrolyte. Examples of the anhydride include cyclic phosphoric anhydride, carboxylic acid anhydride, disulfonic anhydride and carboxylic acid sulfonic anhydride. Examples of the cyclic phosphoric anhydride include trimethyl phosphonic cyclic anhydride, triethyl phosphonic cyclic anhydride and tripropyl phosphonic cyclic anhydride. Examples of the carboxylic acid anhydride include succinic anhydride, glutaric anhydride and maleic anhydride. Examples of the disulfonic anhydride include ethane disulfonic anhydride and propane disulfonic anhydride. Examples of carboxylic acid sulfonic anhydride include sulfobenzoic anhydride, sulfopropionic anhydride and sulfobutyric anhydride. However, the specific examples of the anhydride are not limited to the abovementioned compounds.

In some embodiments, based on the total weight of the electrolyte, the content of anhydride is about 0.01 weight % to about 5 weight %, and further preferably is about 0.1 weight % to about 3 weight %. In some embodiments, based on the total weight of the electrolyte, the content of the anhydride is about 0.01 weight %, about 0.05 weight %, about 0.1 weight %, about 0.2 weight %, about 0.3 weight %, about 0.4 weight %, about 0.5 weight %, about 1.0 weight %, about 2.0 weight %, about 3.0 weight %, about 4.0 weight %, about 5.0 weight % or a range formed by any two of the abovementioned numerical values. As the content of anhydride is in such a range, the chemical stability of the electrolyte may be further improved.

7. Phosphonitrile

In some embodiments, the electrolyte may also contain phosphonitrile. In the compound containing 2 to 3 cyano groups used in the present application, the separator of the present application and phosphonitrile achieve a combined effect to improve the cycle performance of the battery. Examples of phosphonitrile include methoxypentafluorocyclic triphosphazene, ethoxypentafluorocyclic triphosphazene, phenoxypentafluorocyclic triphosphazene and ethoxyheptafluorocyclic tetraphosphazene.

In some embodiments, based on the total weight of the electrolyte, the content of phosphonitrile is about 0.01 weight % to about 5 weight %, and further preferably about 0.1 weight % to about 3 weight %. In some embodiments, based on the total weight of the electrolyte, the content of the phosphonitrile is about 0.01 weight %, about 0.05 weight %, about 0.1 weight %, about 0.2 weight %, about 0.3 weight %, about 0.4 weight %, about 0.5 weight %, about 1.0 weight %, about 2.0 weight %, about 3.0 weight %, about 4.0 weight %, about 5.0 weight % or a range formed by any two of the abovementioned numerical values. As the content of phosphonitrile is in such a range, the chemical stability of the electrolyte may be further improved.

8. Organic Solvent

The electrolyte may also contain an organic solvent. In some embodiments, the organic solvent is selected from one or more of ethylene carbonate (EC), propylene carbonate (PC), diethyl carbonate (DEC), ethyl methyl carbonate (EMC), dimethyl carbonate (DMC), ethyl acetate (EA), ethyl propionate (EP), propyl propanoate (PP), ethyl vinyl sulfone, methyl isopropyl sulfone and isopropyl sec-butyl sulfone.

In some embodiments, the electrolyte includes one or more of the abovementioned compounds containing cyano groups. In some embodiments, the electrolyte contains: one or more of the abovementioned compounds containing cyano groups and one or more of the abovementioned compounds containing sulfur-oxygen double bonds. In some embodiments, the electrolyte contains: one or more of the abovementioned compounds is containing cyano groups and one or more of the abovementioned aromatic compounds. In some embodiments, the electrolyte contains: one or more of the abovementioned compounds containing cyano groups and one or more of the abovementioned phosphate/phosphite. In some embodiments, the electrolyte contains: one or more of the abovementioned compounds containing cyano groups and the cyclic carbonate compound.

In some embodiments, the electrolyte contains: one or more of the abovementioned compounds containing cyano groups, one or more of the abovementioned compounds containing sulfur-oxygen double bonds and one or more of the abovementioned aromatic compounds. In some embodiments, the electrolyte contains: one or more of the abovementioned compounds containing cyano groups, one or more of the abovementioned compounds containing sulfur-oxygen double bonds and one or more of the abovementioned phosphate/phosphite. In some embodiments, the electrolyte contains: one or more of the abovementioned compounds containing cyano groups, one or more of the abovementioned aromatic compounds and one or more of the abovementioned phosphate/phosphite. In some embodiments, the electrolyte contains: one or more of the abovementioned compounds containing cyano groups, one or more of the abovementioned compounds containing sulfur-oxygen double bonds, one or more of the abovementioned aromatic compounds, and one or more of the abovementioned phosphate/phosphite.

9. Electrolyte Salt

In some embodiments, the electrolyte may also contain electrolyte salt. In some embodiments, the electrolyte includes, but is not limited to, inorganic a lithium salt, for example, $LiClO_4$, $LiAsF_6$, $LiPF_6$, $LiBF_4$, $LiSbF_6$, $LiSO_3F$, $LiN(FSO_2)_2$ and the like; a fluorine-containing organic lithium salt, for example, $LiCF_3SO_3$, $LiN(FSO_2)(CF_3SO_2)$, $LiN(CF_3SO_2)_2$, $LiN(C_2F_5SO_2)_2$, cyclo-1,3-hexafluoropropane disulfonimide lithium, cyclo-1,2-tetrafluoroethane disulfonimide lithium, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$ and the like; and dicarboxylic acid complex-containing a lithium salt, for example, lithium bi(oxalato) borate, lithium difluoro oxalato borate, lithium tri(oxalato) phosphate, lithium difluoro bi(oxalato) phosphate, lithium tetrafluoro(oxalato) phosphate. In some embodiments, the electrolyte contains one or more of the abovementioned salts. In some embodiments, the electrolyte contains $LiPF_6$ and $LiBF_4$. In some embodiments, the electrolyte contains a combination of an inorganic lithium salt such as $LiPF_6$ or $LiBF_4$ and a fluorine-containing organic lithium salt such as $LiCF_3SO_3$, $LiN(CF_3SO_2)_2$ or $LiN(C_2F_5SO_2)_2$. In some embodiments, the concentration of the electrolyte salt is in a range of about 0.8 mol/L to about 3 mol/L, for example, in a range of about 0.8 mol/L to about 2.5 mol/L, a range of about 0.8 mol/L to about 2.0 mol/L, a range of about 1 mol/L to about 2 mol/L, and for another example, is about 1 mol/L, about 1.15 mol/L, about 1.2 mol/L, about 1.5 mol/L, about 2 mol/L or about 2.5 mol/L.

II. Separator

The electrochemical device of the present application also includes a separator, which includes a substrate.

In some embodiments, the substrate of the separator includes a first porous layer and a second porous layer.

In some embodiments, the first porous layer or the second porous layer includes one or more selected from the following components: polyethylene, polypropylene, polyethylene glycol terephthalate, polybutylene terephthalate, poly(phenylene phthalamide), polyester, polyacetal, polyacetal, polycarbonate, polyimide, polyether-ether-ketone, polyaryletherketone, polyetherimide, polyamide-imide, polybenzimidazole, polyether sulfone, polyphenyl ether, cyclo-olefin copolymer, polyphenylene sulfide and polyethylene naphthalene.

In some embodiments, the material of the first porous layer and the material of the second porous layer are the same or different in composition.

In the present application, the pore closing temperature of the first porous layer of the separator is about 125° C. to about 134° C., for example, about 127° C., about 129° C., about 131° C. or about 133° C. The pore closing temperature of the second porous layer of the separator is about 133° C. to about 145° C., for example, about 136° C., about 138° C., about 141° C. or about 143° C. In some embodiments, the pore closing temperature of the first porous layer is different from that of the second porous layer, for example, the pore closing temperature of the second porous layer is higher than that of the first porous layer. The pore closing temperature of the first porous layer is lower than that of the second porous layer, such that short circuit caused by shrinkage of the separator in the pore closing process is avoided.

In some embodiments, the first porous layer and the second porous layer have an average pore size of about 0.001 μm to about 10 μm, for example, about 0.005 μm, about 0.01 μm, about 0.1 μm, about 0.5 μm, about 1.0 μm, about 2.0 μm, about 3.0 μm, about 4.0 μm, about 5.0 μm, about 6.0 μm, about 7.0 μm, about 8.0 μm, about 9.0 μm or any range therebetween.

The first porous layer and the second porous layer have a porosity of about 5% to about 45%, for example, about 6%, about 7%, about 8%, about 9%, about 10%, about 15%, about 20%, about 30%, about 35%, about 38%, about 40% or any range therebetween.

In some embodiments, the first porous layer and the second porous layer have a thickness of about 0.05 μm to about 50 μm, a thickness of about 0.05 μm to about 45 μm, a thickness of about 0.05 μm to about 40 μm, a thickness of about 0.05 μm to about 35 μm, a thickness of about 0.05 μm to about 30 μm, a thickness of about 0.05 μm to about 25 μm, a thickness of about 0.05 μm to about 20 μm, a thickness of about 0.05 μm to about 15 μm or a thickness of about 0.05 μm to about 10 μm, for example, about 1.0 μm, about 2.0 μm, about 3.0 μm, about 4.0 μm, about 5.0 μm, about 8.0 μm, about 10 μm, about 15 μm, about 20 μm, about 25 μm, about 30 μm, about 35 μm, about 40 μm, about 45 μm or any range therebetween.

In some embodiments, the separator also has a coating, which is provided on one side or two sides of the first porous layer. In some embodiments, the first porous layer is adjacent to the second porous layer. In the present application, the coating of the separator contains inorganic particles, polymers or a combination thereof.

In some embodiments, the inorganic particles in the coating are connected with one another and are fixed by the polymers. Pore structures are formed with interstitial volumes among the inorganic particles. The inorganic particles have as high an ion conductivity as possible, since such inorganic particles can improve the ion conductivity of the electrochemical device (for example, a lithium secondary battery). The inorganic particles have a density as small as possible, since when the low-density inorganic particles are used, the inorganic particles are easily dispersed in a coating step and may reduce the weight of the electrochemical device (for example, the lithium secondary battery) to be manufactured. Use of the inorganic particles with high dielectric constants is favorable for increasing the dissociation degree of the electrolyte salt in the liquid electrolyte, so as to improve the ion conductivity of the electrolyte. Use of the inorganic particles with low electronic conductivity can effectively isolate electrons, and reduce the thickness of the coating while achieving the same electron isolating effect, such that the energy density of the electrochemical device (for example, the lithium secondary battery) is improved. For the above reasons, in the present application, inorganic particles with a high dielectric constant of 5 or above, inorganic particles with piezoelectricity, inorganic particles with lithium ion conductivity or mixtures thereof are used. Moreover, the inorganic particles may also be selected from at least one of boehmite and magnesium hydroxide.

In some embodiments, the inorganic particles with dielectric constant of 5 or above are selected from one or more of $SrTiO_3$, $SnO_2$, $CeO_2$, $MgO$, $NiO$, $CaO$, $ZnO$, $ZrO_2$, $Y_2O_3$, $Al_2O_3$, $TiO_2$ and $SiC$.

Generally, "materials with piezoelectricity" refer to materials which are insulators under normal pressure but allow current to pass due to change of internal structure thereof when pressure of a certain range is applied to it. The inorganic particles with piezoelectricity show high dielectric constants up to 100 or above. When pressure of a certain range is applied to stretch or compress the inorganic particles, positive electricity is charged to one surface of the inorganic particles, and negative electricity is charged to the other surface thereof. Therefore, a potential difference is generated between two surfaces of the inorganic particles with piezoelectricity. When the inorganic particles with the above characteristics are used in the coating, and when an internal short circuit occurs between two electrodes due to external impact from partial rolling, nails or the like, the inorganic particles spread on the separator prevent direct contact between the anode and the cathode. Moreover, piezoelectricity of the inorganic particles may allow potential differences to be generated in the particles, and thus allow electrons to move, that is, with a tiny flow of current between two electrodes. Therefore, a slow reduction of the voltage of the electrochemical device (for example, the lithium secondary battery) may be realized, and the safety of the electrochemical device may be improved. Non-restricted examples of the inorganic particles with piezoelectricity include $BaTiO_3$, $Pb(Zr,Ti)O_3(PZT)$, $Pb_{1-x}La_xZr_{1-y}Ti_yO_3$ (PLZT), $PB(Mg_{1/3}Nb_{2/3})O_3$—$PbTiO_3$(PMN-PT), hafnium oxide ($HfO_2$) or mixtures thereof.

"Inorganic particles with lithium ion conductivity" refer to inorganic particles containing lithium elements and having the capability of conducting lithium ions instead of storing lithium. The inorganic particles with lithium ion conductivity are capable of conducting and moving lithium ions due to the defects in the structures thereof, which may improve the lithium ion conductivity of the electrochemical device. Non-restricted examples of the inorganic particles with lithium ion conductivity include: lithium phosphate ($Li_3PO_4$), lithium titanium phosphate ($Li_xTi_y(PO_4)_3$, $0<x<2$, $0<y<3$), lithium titanium aluminium phosphate ($Li_xAl_yTi_z(PO_4)_3$, $0<x<2$, $0<y<1$, $0<z<3$), (LiAlTiP)$_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, or mixtures thereof.

The combination of the inorganic particles with a high dielectric constant, the inorganic particles with piezoelectricity and the inorganic particles with lithium ion conductivity may act in combination to improve the performance of the separator of the electrochemical device. Although there is no special restriction for the size of the inorganic particles, for the purpose of forming a coating with uniform thickness and providing proper porosity in the particle size distribution on volume basis, the particle size of the inorganic particles reaching 50% of the accumulated volume from the side with small particle size (Dv50) is about 0.001 μm to about 15 μm. When the particle size is smaller than 0.001 μm, the inorganic particles are poor in dispersity and are prone to conglomerate, such that the physical performance of the coating cannot be easily controlled. When the particle size is greater than about 15 μm, the separator obtained under the same solid weight is too thick and results in pores that are too large, which possibly conduct electrons such that the coating intercalates lithium the coating too early and the effect of preventing the growth of lithium dendrites decreases, while on the other hand, the energy density of the electrochemical device may be reduced.

The content of the inorganic particles is not specifically limited. However, based on the total weight of the mixture of the inorganic particles and the polymers, which is 100%, the weight percent of the inorganic particles is about 30 weight % to about 98 weight %, for example, about 45 weight %, about 50 weight %, about 55 weight %, about 60 weight %, about 65 weight %, about 70 weight %, about 80 weight %, about 90 weight %, about 95 weight %, or a range formed by any two of the abovementioned numerical values. If the weight percent of the inorganic particles is lower than 30 weight %, a large amount of polymers exists. Then, interstitial volume formed between the inorganic particles is reduced, and the pore diameter and the porosity are reduced, resulting in the slowing-down of the conduction of the lithium irons, and degradation of the performance of the electrochemical device. If the weight percent of the inorganic particles is greater than 98%, the content of the polymers is too low. Consequently, the inorganic particles cannot be sufficiently adhered, and the finally formed separator is reduced in mechanical performance.

In the separator of the present application, the polymers may be selected to have a glass transition temperature (Tg) as low as possible, for example, Tg between about −200° C. and about 200° C. The reason for selecting the polymers with the abovementioned Tg is that they are capable of improving mechanical performance such as in flexibility, elasticity and the like of the finally formed separator. The polymers play the roles of mutually connecting and stably fixing the inorganic particles per se, the inorganic particles and the coating as well as the substrate. Thus the first porous layer, the second porous layer and the coating may form an integrated body.

In the embodiments of the present application, the polymers may be selected from one or more of a vinylidene fluoride-hexafluoropropylene copolymer, a vinylidene fluoride-trichloro ethylene copolymer, polystyrene, polyacrylate, polyacrylic acid, polyacrylonitrile, polyvinyl pyrrolidone, polyvinyl acetate, an ethylene-vinyl acetate copolymer, polyimide, polybenzoyl benzenediamine, an acrylonitrile-styrene-butadiene copolymer, polyvinyl alcohol, a styrene-butadiene copolymer and polyvinylidene fluoride. In some embodiments, the polymers contained in the coating not only are capable of isolating electrons, but also are capable of bonding the separator with the cathode or the anode via the contained polymers, so as to realize integration. In some embodiments, the polymers (for example, polybenzoyl benzenediamine) contained in the coating not only can isolate electrons, but also can substantially improve the high temperature resistance performance of the separator.

In the separator of the present application, the coating plays the roles of isolating electrons and conducting lithium ions. When the coating is too thin, the first efficiency will be affected. When the coating is too thick, the energy density of the electrochemical device will be affected seriously. In some embodiments, the thickness of the coating is about 0.5 μm to about 10 μm, for example, the thickness of the coating is about 0.5 μm, about 1.0 μm, about 2 μm, about 3 μm, about 4 μm, about 5 μm, about 6 μm, about 7 μm, about 8 μm, about 9 μm, about 10 μm, or a range formed by any two of the abovementioned numerical values.

In some embodiments, the separator is a low-temperature pore-closing separator, which can thaw or thermally contract at a relatively low temperature to form closed pores, and thereby further improving the overcharging and hot box performances of the electrochemical device. For example, in the lithium ion battery, after the temperature of the battery reaches a certain temperature, pore closing occurs in the low-temperature pore-closing separator, such that lithium ion transfer impedance is increased rapidly to suppress lithium ion transfer. During the overcharging process, an impedance increase causes the constant current charging stage to enter into a constant voltage stage in advance, thus reducing heat generation and restraining subsequent chain reactions. In some embodiments, the pore closing temperature of the separator is about 125° C. to about 145° C.

In some embodiments, the first porous layer is a blend of polypropylene (PP) and polyethylene (PE), wherein the content of PP is about 1% to about 3%, for example, about 1.5%, about 2.0% or about 2.5%, and the molecular weight of PP is about $1.0 \times 10^5$ to about $9.0 \times 10^5$. In some embodiments, the second porous layer is PE having a molecular weight Mw of about $1.0 \times 10^5$ to about $9.0 \times 10^5$.

In some embodiments, the first porous layer is low molecular weight PE having a molecular weight Mw in the range of about $5.0 \times 10^3$ to about $4.0 \times 10^5$, the second porous layer is high molecular weight PE having a molecular weight Mw in a range of about $9.0 \times 10^5$ to about $4.0 \times 10^6$.

In some embodiments, the first porous layer is low molecular weight PE having a molecular weight Mw of about $5.0 \times 10^3$ to about $4.0 \times 10^5$. In some embodiments, the second porous layer is a PP-PE copolymer having molecular weight Mw of about $1.0 \times 10^5$ to about $9.0 \times 10^5$, and in the copolymer, the PP has a content of about 7 to 15%, for example, about 7.5%, about 8.0%, about 8.5%, about 9%, about 10%, about 11%, about 12%, about 13% or about 14%.

III. Others

The electrochemical device of the present application includes a cathode, an anode, and the separator and the electrolyte described herein, wherein the separator is provided between a cathode sheet and an anode sheet at an interval; the cathode includes a cathode current collector and a cathode film coated on the cathode current collector, and the anode includes an anode current collector and an anode film coated on the anode current collector.

In some embodiments, the cathode film of the present application includes a cathode active material, an adhesive and a conductive agent.

In some embodiments, the cathode active material of the present application is selected from at least one of the following materials: nickel-rich ternary materials (NCM, Ni≥0.50), lithium cobalt oxides $LiCoO_2$(LCO), lithium iron phosphate, lithium manganate, high pressure spinel $LiNi_{0.5}Mn_{1.5}CrxO_4$ and lithium-rich ternary cathode materials $(Li_{1+w}Ni_xCo_yMn_zO_2)$ (NCM, 0.50≤x<1, 0≤y≤0.5, 0≤z≤0.5).

In some embodiments, the cathode active materials of the present application are nickel-rich ternary anode materials ($LiNi_xCo_yMn_zO_2$, NCM, x≥0.50, 0≤y≤0.5, 0≤z≤0.5).

In the electrochemical device, the nickel-rich ternary anode material ($LiNi_xCo_yMn_zO_2$ (NCM), 0.50≤x<1) may be used for improving the energy density of the electrochemical device due to relatively high gravimetric specific energy. However, crystal lattices of the nickel-rich ternary cathode material are prone to release oxygen under high voltage, especially, in an overcharging condition. Oxygenolysis of the electrolyte generates gas and heat. During overcharging, lithium precipitation on the anode is gradually increased, and the heat stability of the anode is gradually reduced. When the temperature of the battery increases during charging and reaches a certain critical value, more side reactions occur between the lithium precipitated anode and the electrolyte, resulting in thermal runaway of the battery, and causing such safety problems as battery explosion, ignition and the like. The inventor of the present application surprisingly finds that when the combination of the electrolyte and the composite separator of the present application is used, the overcharging performance, hot box performance and cycle performance of the electrochemical device are improved while the energy density is promoted (for example, the energy density is promoted by using the nickel-rich ternary anode material).

In some embodiments, the anode film of the present application includes an anode active material, an adhesive and/or a conductive agent.

In some embodiments, the anode active material of the present application is synthetic graphite, natural graphite, hard carbon, elementary silicon, a silicon-oxygen compound, silicon alloy, a silicon-carbon compound, a silicon-nitrogen compound or a combination thereof. In some embodiments, the surface of the synthetic graphite, the natural graphite or the hard carbon of the anode active material may be coated with amorphous carbon. The ratio I(110)/I(002) of the X-ray diffraction peak intensity I(002) of the (002) crystal face of the anode active material to the X-ray diffraction peak intensity I(110) of the (110) crystal face is in a range of about 0.002 to about 0.5. In some embodiments, the surfaces of the anode active materials are elementary silicon, the silicon-oxygen compound, the silicon alloy, the silicon-carbon compound and the silicon-nitrogen compound also contain a lithium silicate compound, such as $Li_2SiO_3$, $Li_2Si_2O_5$, and $Li_4SiO_4$.

Additional aspects and advantages of the embodiments of the present application will be described or shown in the following description or interpreted by implementing the examples of the present application.

Examples

The embodiments of the present application will be illustrated in combination with examples below. It should be understood that, these examples are only used for illustrating the present application instead of limiting the protection scope of the claims of the present application.

Preparation Method

1) Preparation of the Electrolyte

In an argon atmosphere glove box with water content of less than 10 ppm, ethylene carbonate (abbreviated as EC), propylene carbonate (abbreviated as PC), diethyl carbonate (abbreviated as DEC) and ethyl methyl carbonate (abbreviated as EMC) were uniformly mixed in a mass ratio of 3:3:6:8. Then, the sufficiently dried lithium salt $LiPF_6$ (1 mol/L) was dissolved in the above non-aqueous solvent. Finally, a certain mass of the additive was added, so as to prepare the electrolyte of examples.

Into the above basic electrolyte, the compound containing 2 to 3 cyano groups was added or other SEI film forming additives were additionally added.

2) Separator

Exemplary composite separators used in the examples are the following low-temperature pore-closing separators (LTS-1, LTS-2, and LTS-3):

LTS-1: formed by the compounding of three layers, wherein a second porous layer was provided between two first porous layers. The first porous layers were prepared by the mixing of a little amount of PP and PE, the molecular weight of PE was about $5.0 \times 10^3$ to about $4.0 \times 10^5$, the molecular weight of PP was about $1.0 \times 10^5$ to about $9.0 \times 10^5$, the PP content was about 1% to about 3%, and the second porous layer was PE having a molecular weight of about $1.0 \times 10^5$ to about $9.0 \times 10^5$. The thickness of the first porous layers is about 4 μm, and the thickness of the second porous layer is about 4 μm. A coating was provided on the first porous layers. The thickness of the coating was about 1.5 μm. The coating had inorganic particles of $Al_2O_3$ and a polymer of polyvinylidene fluoride. The pore closing temperature of the first porous layers was about 131±2° C.

LTS-2: formed by the compounding of three layers, wherein a second porous layer was provided between two first porous layers. The first porous layers used low-molecular-weight PE having a molecular weight of about $5.0 \times 10^3$ to about $4.0 \times 10^5$. The second porous layer used high-molecular-weight PE having a molecular weight of about $9.0 \times 10^5$ to about $4.0 \times 10^6$. The thickness of the first porous layers was about 4 μm, and the thickness of the second porous layer was about 4 μm. A coating was provided on the first porous layers. The thickness of the coating was about 1.5 μm. The coating had inorganic particles of magnesium hydroxide and a polymer of polyvinylidene fluoride. The pore closing temperature was about 129±2° C.

LTS-3: formed by the compounding of three layers, wherein a second porous layer was provided between two first porous layers. The first porous layers used low-molecular-weight PE having a molecular weight of about $5.0 \times 10^3$ to about $4.0 \times 10^5$. The second porous layer used a PP-PE copolymer, which has a PE content of about 7 to about 15% and a molecular weight of about $1.0 \times 10^5$ to about $9.0 \times 10^5$. The thickness of the first porous layers is about 4 μm, and the thickness of the second porous layer is about 4 μm. A coating was provided on the first porous layers. The thickness of the coating was about 1.5 μm. The coating had inorganic particles of boehmite and a polymer of polyvinylidene fluoride. The pore closing temperature of the first porous layers was about 129±2° C.

LTS-4: having compositions similar to LTS-1 with the difference in that the first porous layers of LTS-4 do not have a coating.

LTS-5: having a composition similar to LTS-2 with the difference in that the first porous layers of LTS-5 do not have a coating.

LTS-6: having a composition similar to LTS-3 with the difference in that the first porous layers of LTS-6 do not have a coating.

Conventional monolayer PE separators (S, having a molecular weight of $9.0 \times 10^5$ to $4.0 \times 10^6$) were used as the separator for control groups.

3) Preparation of Cathode

A cathode active material of NCM (having a molecular formula of $LiNi_{0.8}Co_{0.1}Mn_{0.1}O_2$), a conductive agent of acetylene black and an adhesive of polyvinylidene fluoride (abbreviated as PVDF) were sufficiently agitated and mixed in a weight ratio of 96:2:2 in a proper amount of N-methyl pyrrolidone (abbreviated as NMP) solvent to form a uniform cathode slurry. The slurry was applied to the cathode current collector of Al foil which was dried and cold-pressed to obtain the cathode plate.

4) Preparation of Anode

An anode active material graphite, an adhesive of buta-diene styrene rubber (abbreviated as SBR) and a thickener of sodium carboxymethyl cellulose (abbreviated as CMC) were sufficiently agitated and mixed in a weight ratio of 97.4:1.4:1.2 in a proper amount of deionized water solvent to form a uniform anode slurry. The slurry was applied to the anode current collector of Cu foil which was dried and cold-pressed to obtain the anode sheet.

5) Preparation of Lithium Ion Battery

The cathode sheet, the separator and the anode sheet were laminated in order such that the separator was located between the cathode sheet and the anode sheet to provide the isolating function. Then, they were coiled to obtain a naked battery. The naked battery was put into an external packing foil. The prepared electrolyte was injected into the dried battery, which was then subjected to the procedures of vacuum packaging, standing, formation, shaping and the like. The preparation of the lithium ion battery (8 Ah) was finished.

Electrolytes and lithium ion batteries of Examples 1 to 90 and of the comparative examples were prepared according to the abovementioned preparation method; and an overcharging test and high temperature storage test were performed for the battery.

Test Methods

The overcharging test process: the battery was discharged to 2.8 V at 0.5 C at 25° C., then charged under different voltages as shown in the table at 2 C constant current, and then charged at a constant voltage for 3 h. Temperature change on the surface of the battery was monitored. No ignition or smoking was determined as passing the test. Test 10 batteries in this experiment and record the number of tests passed.

Hot box test process: the battery was charged to 4.2 V at 0.5 C constant current, then charged at 4.2 V constant voltage until the current was 0.005 C. The battery was allowed to stand for 60 min at 25° C. The appearance was inspected and photographed. The temperature was increased to 140° C. at the rate of 5° C./min, and kept for 120 min. After the test was ended, the appearance was inspected and photographed, while the voltage and temperature were monitored during the test process. No ignition or smoking was determined as passing the test. Test 10 batteries in this experiment and record the number of tests passed.

25° C. cyclic test process: the battery was discharged to 2.8 V at 6 C at a temperature of 25° C., and then charged at the current of 2 C until the voltage was 4.2 V. After cycling in this way, the discharge capacity retention rate percentage of the 600$^{th}$ cycle was calculated by taking the discharge capacity of the 1$^{st}$ cycle as its basis. The calculation method is as follows:

Cyclic capacity retention rate=discharge capacity of the 600$^{th}$ cycle/discharge capacity of the 1St cycle×10000.

High temperature storage test process: the battery was charged to 4.2 V at 2 C constant current at 25° C., and then charged to a filled state at 0.05 C constant voltage. The battery was put into an oven at 85° C., and fully charged for 6 h. The thickness change was monitored. The thickness of the initial 50% SOC was taken as a standard.

"1 C" refers to a current value at which the battery capacity is completely discharged within 1 hour.

Examples 1 to 24 illustrate the electrolyte including the compounds containing cyano groups, and the performance test results thereof are shown in Table 1 below.

TABLE 1

Electrolytes of Examples 1 to 24 and comparative examples and the test results

| | Separator | Compound containing cyano groups Structural formula | Content | Overcharging test Voltage | Overcharging test Passed number | Hot box test Passed number |
|---|---|---|---|---|---|---|
| Example 1 | LTS-2 | II-1 | 0.1 | 8 V | 7 | 6 |
| Example 2 | LTS-2 | II-1 | 0.3 | 8 V | 10 | 9 |
| Example 3 | LTS-2 | II-1 | 0.5 | 9 V | 9 | 10 |
| Example 4 | LTS-2 | II-1 | 1 | 10 V | 6 | 10 |
| Example 5 | LTS-2 | II-1 | 2 | 10 V | 10 | 10 |
| Example 6-A | LTS-2 | II-1 | 3 | 10 V | 10 | 10 |
| Example 6-B | LTS-2 | II-1 | 3 | 11 V | 0 | |
| Example 7 | LTS-2 | II-1 | 5 | 11 V | 0 | 10 |
| Example 8 | LTS-2 | II-1 | 10 | 11 V | 0 | 10 |
| Example 9 | LTS-4 | II-2 | 2 | 9 V | 7 | 6 |
| Example 10 | LTS-5 | II-2 | 2 | 9 V | 8 | 7 |
| Example 11 | LTS-6 | II-2 | 2 | 9 V | 8 | 6 |
| Example 12 | LTS-4 | II-1 | 2 | 9 V | 7 | 6 |
| Example 13-A | LTS-2 | I-1 | 2 | 9 V | 9 | 8 |
| Example 13-B | LTS-2 | I-1 | 2 | 10 V | 0 | |
| Example 14 | LTS-2 | I-2 | 2 | 9 V | 0 | 7 |
| Example 15 | LTS-2 | I-3 | 2 | 9 V | 8 | 7 |
| Example 16-A | LTS-2 | II-2 | 2 | 10 V | 10 | 10 |
| Example 16-B | LTS-2 | II-2 | 2 | 11 V | 3 | |
| Example 17-A | LTS-2 | II-3 | 2 | 10 V | 6 | 10 |
| Example 17-B | LTS-2 | II-3 | 2 | 11 V | 0 | |
| Example 18 | LTS-2 | II-2 + I-3 | 1 + 1 | 10 V | 8 | 10 |
| Example 19A | LTS-2 | II-2 + I-2 | 1 + 1 | 10 V | 10 | 10 |
| Example 19B | LTS-2 | II-2 + I-2 | 1 + 1 | 11 V | 0 | |
| Example 20 | LTS-2 | II-2 + I-2 | 1 + 1 | 10 | 7 | 10 |
| Example 21 | LTS-1 | II-1 | 2 | 10 V | 8 | 9 |
| Example 22 | LTS-1 | II-2 | 2 | 10 V | 9 | 10 |
| Example 23 | LTS-3 | II-1 | 2 | 10 V | 8 | 10 |
| Example 24 | LTS-3 | II-2 | 2 | 10 V | 9 | 10 |
| Comparative Example 1 | S | — | — | 5 V | 0 | 0 |
| Comparative Example 2 | S | II-2 | 2 | 5 V | 6 | 0 |
| Comparative Example 3-A | LTS-1 | — | — | 6 V | 10 | 5 |
| Comparative Example 3-B | LTS-1 | — | — | 7 V | 8 | |
| Comparative Example 3-C | LTS-1 | — | — | 8 V | 0 | |
| Comparative Example 4-A | LTS-2 | — | — | 7 V | 10 | 5 |
| Comparative Example 4-B | LTS-2 | — | — | 8 V | 7 | |
| Comparative Example 5-A | LTS-3 | — | — | 6 V | 9 | 5 |
| Comparative Example 5-B | LTS-3 | — | — | 7 V | 3 | |

It may be seen from the examples and the comparative examples 1 and 2 of Table 1 that, comparative examples 1 and 2 used common separators (monolayer separator, S), which failed to pass the 2C, 5 V overcharging test, and the hot box test. By using the separator (the composite separator) provided by the present application, the overcharging performance and the hot box performance were substantially improved. When the compounds containing 2 to 3 cyano groups was added to the electrolyte, the overcharging performance and the hot box performance of the device were substantially improved.

The combination of the compounds containing the cyano groups and the low-temperature pore-closing diaphragm provided synergistic effects. The compounds containing the cyano groups can improve the interface stability of the cathode material and thereby reducing the decomposition of the electrolyte on the surface of the electrode and slowing down the temperature rise during the overcharging process and the hot box process. When the temperature increased until the separator's pores closed, lithium ion transfer can be suppressed or completely suppressed to stop further charging. However, by using the low-temperature pore-closing separator, the pores were closed at a relatively low temperature, and thereby preventing thermal runaway, and providing the effects of improving overcharging and hot box performances.

Examples 25 to 44 illustrate the combined use of the compounds containing the cyano groups and the compounds containing sulfur-oxygen double bond functional groups.

The prepared batteries were tested for their overcharging performance. The test results are shown in Table 2 below.

TABLE 2

Electrolyte of Examples 16 and 25 to 44 and the test results

| | Separator | Compound containing cyano groups Structural formula | Content | Compound containing sulfur-oxygen double bond functional groups Structural formula | Content | Overcharging test Voltage | Passed number | Stored at 85° C. |
|---|---|---|---|---|---|---|---|---|
| Example 16-A | LTS-2 | II-2 | 2 | — | — | 10 V | 10 | 15.0% |
| Example 16-B | LTS-2 | II-2 | 2 | — | — | 11 V | 3 | |
| Example 25 | LTS-2 | II-2 | 2 | III-5 | 0.1 | 11 V | 3 | 14.6% |
| Example 26 | LTS-2 | II-2 | 2 | III-5 | 0.5 | 11 V | 3 | 14.1% |
| Example 27 | LTS-2 | II-2 | 2 | III-5 | 1 | 11 V | 4 | 13.3% |
| Example 28 | LTS-2 | II-2 | 2 | III-5 | 3 | 11 V | 7 | 12.9% |
| Example 29 | LTS-2 | II-2 | 2 | III-5 | 4 | 11 V | 7 | 12.7% |
| Example 30 | LTS-2 | II-2 | 2 | III-5 | 5 | 11 V | 10 | 12.6% |
| Example 31-A | LTS-2 | II-2 | 2 | III-5 | 8 | 12 V | 7 | 11.9% |
| Example 31-B | LTS-2 | II-2 | 2 | III-5 | 8 | 15 V | 0 | |
| Example 32 | LTS-2 | II-2 | 2 | III-5 | 20 | 12 V | 10 | 12.7% |
| Example 33 | LTS-2 | II-2 | 1 | III-5 | 1 | 11 V | 5 | 13.5% |
| Example 34 | LTS-2 | II-2 | 1 | III-11 | 1 | 11 V | 4 | 12.6% |
| Example 35 | LTS-2 | II-2 | 1 | III-11 | 2 | 11 V | 5 | 12.2% |
| Example 36 | LTS-2 | II-2 | 1 | III-11 | 3 | 10 V | 10 | 12.5% |
| Example 37 | LTS-2 | II-2 | 1 | III-13 | 1 | 11 V | 5 | 13.6% |
| Example 38 | LTS-2 | II-2 | 1 | III-13 | 2 | 10 V | 7 | 12.5% |
| Example 39 | LTS-2 | II-2 | 1 | III-12 | 1 | 10 V | 3 | 11.6% |
| Example 40 | LTS-2 | II-2 | 1 | III-12 | 2 | 10 V | 6 | 12.7% |
| Example 41 | LTS-2 | II-2 | 1 | III-12 | 3 | 10 V | 10 | 12.2% |
| Example 42 | LTS-2 | II-1 | 2 | III-5 | 5 | 12 V | 6 | 11.8% |
| Example 43 | LTS-1 | II-1 | 2 | III-5 | 8 | 12 V | 6 | 11.7% |
| Example 44 | LTS-4 | II-2 | 2 | III-5 | 8 | 11 V | 4 | 14.2% |

It may be seen from the examples of Table 2 that the compounds containing sulfur-oxygen double bond functional groups and the compounds containing the cyano groups as well as the low-temperature pore-closing separator provided synergistic effects. The compounds containing the cyano groups and the compounds containing sulfur-oxygen double bond functional groups respectively protected the interfaces of the anode and the cathode. When the temperature was too high, the separator can suppress the lithium ion transfer and meanwhile reduce shrinkage of the separator, and prevent a short circuit caused by the contact of the anode and the cathode. The three of them acted in combination to prevent thermal runaway during the overcharging or hot box process. That was possible because the combined action of the three may further improve the oxidation resistance of the electrolyte, and meanwhile a stable protection film was formed on the electrode surface of the anode. Specifically, a passivation membrane was formed on the surface of the lithium dendrites. Preferably, the added amount of the compounds containing sulfur-oxygen double bond functional groups was about 3% to about 8%, and a better improvement effect for overcharging was obtained in such a range.

Examples 45 to 60 illustrate the electrolyte including the compounds containing cyano groups and fluorobenzene. The overcharging performance and the cycle performance were tested for these examples. The test results are shown in Table 3 below.

TABLE 3

Electrolyte of Examples 16 and 45 to 60 and the test results

| Examples | Separator | Compound containing cyano groups Structural formula | Content | Aromatic compound Structural formula | Content | Overcharging test Voltage | Passed number | Cyclic capacity retention rate |
|---|---|---|---|---|---|---|---|---|
| Example 16-A | LTS-2 | II-2 | 2 | | | 10 V | 10 | 84.9% |
| Example 16-B | LTS-2 | II-2 | 2 | | | 11 V | 3 | |
| Example 45 | LTS-2 | II-2 | 2 | PFT | 0.1 | 10 V | 10 | 85.3% |
| Example 46 | LTS-2 | II-2 | 2 | PFT | 0.5 | 10 V | 10 | 85.9% |
| Example 47 | LTS-2 | II-2 | 2 | PFT | 1 | 11 V | 6 | 86.7% |
| Example 48-A | LTS-2 | II-2 | 2 | PFT | 2 | 11 V | 10 | 87.5% |
| Example 48-B | LTS-2 | II-2 | 2 | PFT | 2 | 12 V | 0 | |
| Example 49 | LTS-2 | II-2 | 2 | PFT | 3 | 12 V | 0 | 87.6% |
| Example 50 | LTS-2 | II-2 | 2 | PFT | 5 | 12 V | 0 | 87.0% |
| Example 51-A | LTS-1 | II-2 | 2 | PFT | 2 | 10 V | 10 | 88.6% |

TABLE 3-continued

Electrolyte of Examples 16 and 45 to 60 and the test results

| Examples | Separator | Compound containing cyano groups Structural formula | Content | Aromatic compound Structural formula | Content | Overcharging test Voltage | Passed number | Cyclic capacity retention rate |
|---|---|---|---|---|---|---|---|---|
| Example 51-B | LTS-1 | II-2 | 2 | PFT | 2 | 11 V | 4 | |
| Example 52 | LTS-2 | II-2 | 2 | DFBP | 0.1 | 10 V | 10 | 85.1% |
| Example 53 | LTS-2 | II-2 | 2 | DFBP | 0.5 | 10 V | 10 | 85.6% |
| Example 54 | LTS-2 | II-2 | 2 | DFBP | 1 | 11 V | 6 | 86.9% |
| Example 55 | LTS-2 | II-2 | 2 | DFBP | 2 | 11 V | 10 | 87.9% |
| Example 56 | LTS-2 | II-2 | 2 | DFBP | 3 | 12 V | 4 | 88.7% |
| Example 57 | LTS-2 | II-2 | 2 | DFBP | 5 | 12 V | 3 | 88.3% |
| Example 58 | LTS-2 | II-1 | 2 | PFT | 2 | 11 V | 9 | 88.2% |
| Example 59 | LTS-1 | II-1 | 2 | PFT | 2 | 10 V | 10 | 87.5% |
| Example 60 | LTS-4 | II-1 | 2 | PFT | 2 | 10 V | 8 | 85.5% |

It may be seen from the data in Table 3 that, after fluorobenzene (for example, PFT, DFBP) was added, the cyclic capacity retention rate of the battery was improved to some extent, possibly due to the fact that the combination of the compounds containing cyano groups, the low-temperature pore-closing diaphragm and fluorobenzene can reduce a conductivity decline caused by overcharging, and avoid excessive gas production in a high temperature storage condition. During the overcharging process, they were electro-polymerized to form a conducting membrane and thus improved the overcharging performance and the cycle performance of the electrolyte. Moreover, these materials in certain content ranges can keep the thickness of the anode and cathode protective films in a proper range to reduce an impedance increase, and thereby affect the cycle performance.

Examples 61 to 75 illustrate the electrolytes comprising the compounds containing the cyano groups and the phosphate/phosphite. The following Table 4 provides the performance test results.

It may be seen from the data of Table 4 that, further adding the phosphate or phosphite compound to the electrolyte can achieve the effects of further improving overcharging protection, and can substantially improve the high temperature storage performance, possibly due to the fact that the combination of the compounds containing the cyano groups, the low-temperature pore-closing separator and fluorobenzene can substantially improve the interface performance of the electrolyte and the separator in the battery, reduce the decomposition of the SEI membrane, and suppress the forming of lithium dendrites.

The electrochemical device provided by Examples 76 to 91 included the separator and the electrolyte comprising at least three additives selected from the following compounds: the compound containing cyano groups, the compound containing sulfur-oxygen double bonds, the fluorobenzene compound and the phosphate or phosphite compound. The performance test results are provided in Table 5 below.

Additives involved in table 5 include: 1,2,3-tri(2-cyanooethoxy)propane (TCEP), 1,3,6-hexanetricarbonitrile (HTCN), 1,2,5-pentanetricarbonitrile (PTCN), 2,4-difluorobiphenyl (DFBP), p-fluorotoluene (PFT), triphenyl phosphate (TPP), tris(2,2,2-trifluoroethyl) phosphite (TTFEP) sulfolane (formula I-5), and 1,3-propane sultone (formula f a-11).

TABLE 4

Electrolyte of Examples 16 and 61 to 75 and the test results

| Examples | Separator | Compound containing cyano groups Structural formula | Content | phosphate/phosphite Structural formula | Content | Overcharging test Voltage | Passed number | Stored at 85° C. |
|---|---|---|---|---|---|---|---|---|
| Example 16 | LTS-2 | II-2 | 2 | — | — | 11 V | 3 | 15.0% |
| Example 61 | LTS-2 | II-2 | 2 | TPP | 0.1 | 11 V | 3 | 14.2% |
| Example 62 | LTS-2 | II-2 | 2 | TPP | 0.5 | 11 V | 3 | 13.6% |
| Example 63 | LTS-2 | II-2 | 2 | TPP | 1 | 11 V | 5 | 11.0% |
| Example 64-A | LTS-2 | II-2 | 2 | TPP | 2 | 11 V | 10 | 9.5% |
| Example 64-B | LTS-2 | II-2 | 2 | TPP | 2 | 12 V | 1 | |
| Example 65 | LTS-2 | II-2 | 2 | TPP | 3 | 11 V | 10 | 9.6% |
| Example 66 | LTS-2 | II-2 | 2 | TPP | 5 | 11 V | 10 | 9.3% |
| Example 67 | LTS-2 | II-2 | 2 | TTFEP | 0.1 | 11 V | 4 | 14.5% |
| Example 68 | LTS-2 | II-2 | 2 | TTFEP | 0.5 | 11 V | 4 | 13.0% |
| Example 69 | LTS-2 | II-2 | 2 | TTFEP | 1 | 11 V | 7 | 10.7% |
| Example 70 | LTS-2 | II-2 | 2 | TTFEP | 2 | 11 V | 7 | 10.4% |
| Example 71 | LTS-2 | II-2 | 2 | TTFEP | 3 | 12 V | 0 | 9.4% |
| Example 72 | LTS-2 | II-2 | 2 | TTFEP | 5 | 12 V | 2 | 9.3% |
| Example 73 | LTS-2 | II-1 | 2 | TPP | 2 | 11 V | 10 | 9.8% |
| Example 74 | LTS-1 | II-1 | 2 | TPP | 2 | 11 V | 10 | 9.4% |
| Example 75 | LTS-4 | II-2 | 2 | TPP | 2 | 11 V | 1 | 12.3% |

A 12 V voltage was adopted for the overcharging test in Table 5, unless otherwise noted.

TABLE 5

Electrolyte of Examples 16 and 76 to 90 and the test results

| Examples | Separator | Compound containing cyano groups Structural formula | Content | Compound containing sulfur-oxygen double bonds Structural formula | Content | Aromatic compound Structural formula | Content | Phosphate/phosphite Structural formula | Content | Overcharging test Passed number | Stored at 85° C. |
|---|---|---|---|---|---|---|---|---|---|---|---|
| Example 16 | LTS-2 | II-2 | 2 | — | — | — | — | — | — | 0 | 15.0% |
| Example 76-A | LTS-2 | II-2 | 2 | III-5 | 8 | PFT | 3 | — | — | 9 | 10.9% |
| Example 76-B | LTS-2 | II-2 | 2 | III-5 | 8 | PFT | 3 | — | — | 0 (15 V) | 10.8% |
| Example 77 | LTS-2 | II-2 | 2 | III-5 | 8 | DFBP | 3 | — | — | 8 | 10.8% |
| Example 78 | LTS-2 | II-2 | 2 | III-11 | 2 | PFT | 3 | — | — | 0 | 11.2% |
| Example 79 | LTS-2 | II-2 | 2 | III-5 | 8 | — | — | TPP | 3 | 7 | 6.9% |
| Example 80 | LTS-2 | II-2 | 2 | III-5 | 8 | — | — | TTFEP | 3 | 7 | 5.9% |
| Example 81 | LTS-2 | II-2 | 2 | — | — | PFT | 3 | TTFEP | 3 | 5 | 6.7% |
| Example 82 | LTS-2 | I-1 + II-2 | 1 + 1 | III-5 | 8 | — | — | TTFEP | 3 | 7 | 6.9% |
| Example 83 | LTS-2 | II-1 | 2 | — | — | PFT | 3 | TTFEP | 3 | 3 | 7.1% |
| Example 84 | LTS-2 | II-3 | 2 | — | — | PFT | 3 | TTFEP | 3 | 4 | 7.5% |
| Example 85 | LTS-2 | II-2 | 2 | III-5 | 8 | PFT | 3 | TTFEP | 3 | 10 | 8.1% |
| Example 86 | LTS-2 | II-2 | 2 | III-5 | 8 | PFT + DFBP | 1 + 2 | — | — | 9 | 10.2% |
| Example 87 | LTS-2 | II-2 | 2 | III-5 | 8 | PFT + DFBP | 2 + 2 | — | — | 9 | 13.2% |
| Example 88 | LTS-2 | I-1 + II-2 | 1 + 1 | III-5 | 8 | PFT | 3 | — | — | 10 | 12.6% |
| Example 89 | LTS-1 | I-1 + II-2 | 1 + 1 | III-5 | 8 | PFT | 3 | TTFEP | 3 | 10 | 9.2% |
| Example 90 | LTS-4 | II-2 | 2 | III-5 | 8 | PFT | 3 | TTFEP | 3 | 1 | 11.1% |

It may be seen from the data in Table 5 that, the combination of at least three of the compounds containing cyano groups, the compounds containing sulfur-oxygen double bonds, the fluorobenzene compound and the phosphate or phosphite compound achieved improvement of the overcharging performance and the high temperature storage performance.

References to "some embodiments", "part of the embodiments", "one embodiment", "another example", "example", "specific example" or "part of the examples" in the whole specification mean that at least one embodiment or example in the application comprises specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. An electrochemical device, comprising:
   a separator, comprising a first porous layer and a second porous layer; and
   an electrolyte, comprising a compound containing 3 cyano groups, wherein the compound containing 3 cyano groups comprises a compound having formula II-A,

Formula II-A wherein $R^{21}$, $R^{22}$, $R^{23}$ are respectively independently selected from substituted or unsubstituted $C_1$-$C_{10}$ alkylene, substituted or unsubstituted $C_1$-$C_{10}$ alkyleneoxy, substituted or unsubstituted $C_2$-$C_{10}$ alkenyl, substituted or unsubstituted $C_6$-$C_{10}$ aryl, and substituted or unsubstituted $C_3$-$C_{10}$ cycloalkyl, n, m and l are each independently selected from 0 or 1, and at least two of the n, m and l are not 0;

wherein the electrolyte further comprises a compound containing sulfur-oxygen double bonds of the following formulae:

(III-A)

(III-B)

wherein $R^{31}$ and $R^{32}$ are each independently selected from substituted or unsubstituted $C_1$-$C_5$ alkyl, substituted or unsubstituted $C_2$-$C_{10}$ alkenyl, substituted or unsubstituted $C_6$-$C_{10}$ aryl, and substituted or unsubstituted $C_1$-$C_6$ heterocyclic groups containing 1 to 5 heteroatoms selected from O, S, and P; wherein, when substituted, it refers to being substituted by one or more substituent groups selected from halogen, nitryl, cyano, carboxyl or sulfonic acid group;

$R^{33}$ and $R^{34}$ are each independently selected from substituted or unsubstituted $C_1$-$C_6$ alkylene, and substituted or unsubstituted $C_2$-$C_6$ alkenylene, wherein carbon atoms in $R^{33}$ and $R^{34}$ can be optionally replaced with heteroatoms selected from O, S, and P, wherein, when substituted, it refers to being substituted by one or more substituent groups selected from halogen, $C_1$-$C_3$ alkyl or $C_2$-$C_4$ alkenyl; and wherein based on a total weight of the electrolyte, a content of the compound containing 3 cyano groups is A weight %, and a content of the compound containing sulfur-oxygen double bonds is B weight %, wherein $0.05 \leq A/B \leq 10$.

2. The electrochemical device according to claim 1, wherein a pore closing temperature of the first porous layer is different from a pore closing temperature of the second porous layer.

3. The electrochemical device according to claim 1, wherein the first porous layer is adjacent to the second porous layer, and the pore closing temperature of the second porous layer is higher than the pore closing temperature of the first porous layer.

4. The electrochemical device according to claim 1, wherein the separator further comprises a coating disposed on the first porous layer, and the coating comprises at least one of an inorganic particle and a polymer.

5. The electrochemical device according to claim 1, wherein the first porous layer or the second porous layer comprises at least one of the following polymers: polyethylene, polypropylene, polyethylene glycol terephthalate, polybutylene terephthalate, poly(phenylene phthalamide), polyester, polyacetal, polyamide, polycarbonate, polyimide, polyether-ether-ketone, polyaryletherketone, polyetherimide, polyamide-imide, polybenzimidazole, polyether sulfone, polyphenyl ether, cyclo-olefin copolymer, polyphenylene sulfide and polyethylene naphthalene.

6. The electrochemical device according to claim 1, wherein the electrolyte further comprises a compound containing 2 cyano groups; the compound containing 2 cyano groups comprises a compound having formula I-A:

NC―R¹―CN, and    Formula I-A wherein R¹ is respectively selected from substituted or unsubstituted $C_1$-$C_{10}$ alkylene, substituted or unsubstituted $C_1$-$C_{10}$ alkyleneoxy, substituted or unsubstituted $C_2$-$C_{10}$ alkenyl, substituted or unsubstituted $C_6$-$C_{10}$ aryl, and substituted or unsubstituted $C_3$-$C_{10}$ cycloalkyl.

7. The electrochemical device according to claim 1, wherein the compound containing 3 cyano groups comprises at least one of the following compounds:

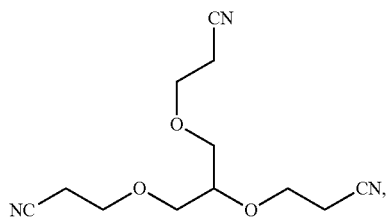
(II-1)

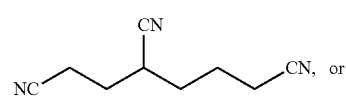
(II-2)

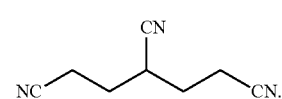
(II-3)

8. The electrochemical device according to claim 1, wherein the compound containing sulfur-oxygen double bonds including at least one of the following compounds:

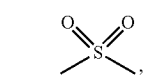
(III-1)

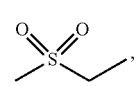
(III-2)

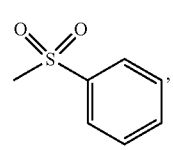
(III-3)

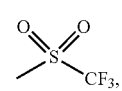
(III-4)

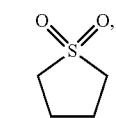
(III-5)

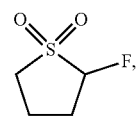
(III-6)

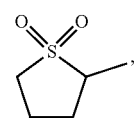
(III-7)

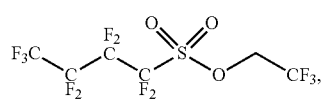
(III-8)

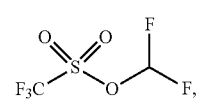
(III-9)

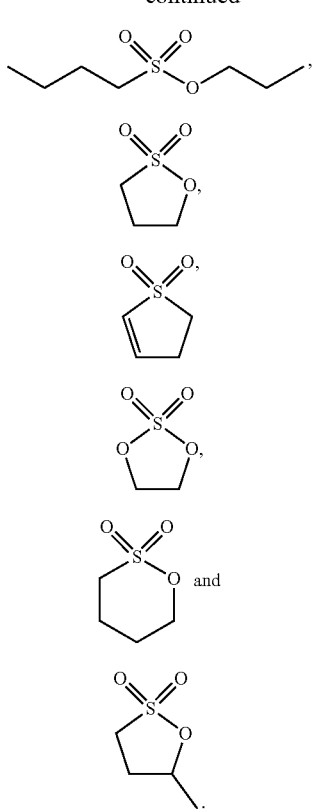

(III-10)
(III-11)
(III-12)
(III-13)
(III-14)
(III-15)

9. The electrochemical device according to claim 1, wherein the compound containing sulfur-oxygen double bonds comprises a sulphone compound.

10. The electrochemical device according to claim 1, wherein the electrolyte further comprises at least one of an aromatic compound and a phosphorous compound,
   wherein the aromatic compound comprises at least one of the following compounds:
   2-fluorotoluene, 3-fluorotoluene, 4-fluorotoluene, 2,4-difluorotoluene, 2-fluorobiphenyl, 3-fluorobiphenyl, 4-fluorobiphenyl, 4,4'-difluorobiphenyl, 2,4-difluorobiphenyl, o-cyclohexylfluorobenzene, p-cyclohexylfluorobenzene, 2,4-difluoroanisole, 2,5-difluoroanisole, 2,6-difluoroanisole, and 3,5-difluoroanisole; and
   the phosphorous compound comprises at least one of the following compounds: tri(2-tertiarypentylphenyl) phosphate, tri(3-tertiarypentylphenyl) phosphate, tri(4-tertiarypentylphenyl) phosphate, tri(2-cyclohexylphenyl) phosphate, tri(3-cyclohexylphenyl) phosphate, tri (4-cyclohexylphenyl) phosphate, triphenyl phosphate, tri(2-methylphenyl) phosphate, tri(2-tertiarybutylphenyl) phosphate, tris(2,2,2-trifluoroethyl) phosphate (TFEP), tri(2-tertiarypentylphenyl) phosphite, tri(3-tertiarypentylphenyl) phosphite, tri(4-tertiarypentylphenyl) phosphite, tri(2-cyclohexylphenyl) phosphite, tri (3-cyclohexylphenyl) phosphite, tri(4-cyclohexylphenyl) phosphite, triphenyl phosphite, tri (2-methylphenyl) phosphite, tri(2-tertiarybutylphenyl) phosphite, and tri(2,2,2-trifluoroethyl) phosphite.

11. The electrochemical device according to claim 4, wherein the thickness of the first porous layer is 0.05 μm to 10 μm, and the thickness of the coating is 0.06 μm to 4 μm.

12. The electrochemical device according to claim 1, wherein based on the total weight of the electrolyte, the content of the compound containing 3 cyano groups is 0.05 weight % to 10 weight %.

13. The electrochemical device according to claim 1, wherein based on the total weight of the electrolyte, the content of the compound containing sulfur-oxygen double bonds is 0.01 weight % to 9.5 weight %.

14. The electrochemical device according to claim 1, wherein 0.05≤A/B≤4.

15. The electrochemical device according to claim 12, wherein based on the total weight of the electrolyte, the content of the compound containing 3 cyano groups is 0.1 weight % to 6 weight %.

16. The electrochemical device according to claim 6, wherein the compound containing 2 cyano groups comprises at least one of the following compounds:

 (I-1)

 (I-2)

 (I-3)

* * * * *